United States Patent [19]

Graiver et al.

[11] Patent Number: 5,629,401
[45] Date of Patent: May 13, 1997

[54] PREPARATION OF POLYORGANOSILOXANES BY INTERFACIAL POLYMERIZATION

[75] Inventors: Daniel Graiver, Midland; Arnold W. Lomas, Rhodes, both of Mich.

[73] Assignee: Dow Corning Corporation, Midland, Mich.

[21] Appl. No.: 626,711

[22] Filed: Apr. 1, 1996

[51] Int. Cl.$^6$ ................................. C08G 77/00
[52] U.S. Cl. .................. 528/43; 528/14; 528/18; 528/37; 528/38; 528/32; 528/34
[58] Field of Search ................ 528/43, 37, 18, 528/14, 38, 32, 34

[56] References Cited

U.S. PATENT DOCUMENTS

| | | | |
|---|---|---|---|
| 3,337,497 | 8/1967 | Bostick | 528/43 |
| 3,641,090 | 2/1972 | Bostick | 260/448 |
| 4,493,714 | 1/1985 | Ueda | 55/16 |
| 4,518,547 | 5/1985 | Cuff | 264/4.7 |
| 4,604,442 | 8/1986 | Rich | 528/28 |
| 5,169,920 | 12/1992 | Okawa | 528/37 |
| 5,223,596 | 6/1993 | Okawa et al. | 528/37 |

FOREIGN PATENT DOCUMENTS 631506  11/1949  United Kingdom .

*Primary Examiner*—Melvyn I. Marquis
*Attorney, Agent, or Firm*—James L. DeCesare

[57] ABSTRACT

An interfacial polymerization process wherein organosilicon reactants are dissolved in mutually immiscible, nonaqueous solvents, and a condensation product is formed at the interface. This technique has many of the advantages of analogous organic interfacial polymerization, and may be used, for example, to prepare crosslinked films, fibers, particles, or encapsulants. Structures which cannot be prepared by other routes can be made. In particular, a well-defined alternating dimethyl/diphenyl siloxane block copolymer can be prepared by condensing a dihalo organosilicon compound such as diphenyldichlorosilane $(C_6H_5)_2SiCl_2$ in diphenyl ether with a dimethyl silanolate in cyclohexane. The advantages are ability to control polymer structure, and there is no rearrangement during polymerization.

7 Claims, No Drawings

PREPARATION OF POLYORGANOSILOXANES BY INTERFACIAL POLYMERIZATION

BACKGROUND OF THE INVENTION

This invention is directed to silicone copolymers prepared by nonaqueous interfacial polymerization, where polycondensation takes place at the interface between reactive starting materials dissolved in separate and immiscible solvents. One example is an alternating polysiloxane copolymer of dimethyl and diphenyl siloxanes obtained by the condensation of a phenyldichlorosilane with an alkali metal methyl silanolate. A major advantage of interfacial polymerization of silicon containing monomers is ability to control structures of resulting polymer chains and compositions of copolymers, without need of a conventional catalyst, and without problems associated with rearrangement during polymerization.

Interfacial polymerization of certain organic monomers is a known polycondensation reaction wherein monomers are dissolved in immiscible solvents. Polymerization occurs when the monomer in one phase diffuses from the bulk of the solution into the interface and reacts with the monomer from the other phase. The polymerization rate depends on diffusion rates and reactivity of functional groups on the monomers.

We have found that when a dichlorosilane is dissolved in one phase, and a potassium silanolate or other metal silanolate, is dissolved in the other phase, the reaction rate to form potassium chloride or other chloride salt is faster, compared to the typical polycondensation reaction, and leads to high molecular weight polysiloxanes.

Furthermore, since the inorganic salt by-product is not soluble in either of the organic solvents, it precipitates and does not interfere with the polycondensation reaction. If the copolymer is insoluble in either solvent, it also precipitates and can be removed from the interface.

Among some known interfacial polymerization reactions are polycondensation of amines with acetyl chloride to form nylon (i.e., polyamides), and the reaction of alcohols with acids to form polyesters. Interfacial polymerization of these organic monomers typically provide faster polymerization rates than other types of polymerization reactions such as bulk or solution polymerizations. Even more important is the fact that higher molecular weight polymers can be obtained because stoichiometry between the monomers need not be precise.

This is particularly critical for organic polycondensation reactions where an imbalance of a fraction of a percent causes the extent of polymerization to be greatly affected. Another advantage of interfacial polymerization reactions is formation of high molecular weights at the interface regardless of overall percent conversion of bulk amounts of the two reactants still in solution.

Thus, among the many advantages offered by interfacial polymerization in synthesis of various organic polymers are (i) the ability to prepare infusible polymers; (ii) the ability to synthesize polymers with chemically active substituents as well as heteroatoms; (iii) controlled crosslinking of polymer structure; (iv) the ability to use cis- and trans-conformation without rearrangement; (v) the ability to prepare optically active polymers without decomposition of intermediates; (vi) the ability to use short-chain and ortho-substituted ring intermediates; (vii) the ability to use thermally unstable intermediates to form thermally stable polymers; (viii) the ability to form block and ordered copolymers; (ix) the ability to form synthetic elastomers; (x) a direct method of forming polymer solutions and dispersions; (xi) a direct method for polymerization of polymer coatings; and (xii) a direct method for polymerization of monomers to fibrous particulates, fibers, and films.

We have now discovered that many of these advantages can be utilized in the interfacial polymerization of silicon containing monomers to form siloxane polymers and copolymers.

BRIEF SUMMARY OF THE INVENTION

The invention relates to a method of making copolymers by reacting a nonaqueous organic solvent solution of a dihalo or diacycloxy organosilicon compound such as an organodihalosilane or an organodiacetoxysilane at an interface formed with an immiscible nonaqueous organic solvent solution of a silanolate or an organosilanolate. The silanolate or organosilanolate has the formula $R''_x Si(OM)_{4-x}$ or $MO(R''_2 SiO)_n M$ where $R''$ is an alkyl radical of 1–6 carbon atoms, an aryl radical, an alkenyl radical, an alkylamino radical, or an epoxy radical; $x$ is 0–2; $n$ is at least one; and M is an alkali metal. Upon completion of the reaction, the block copolymer is recovered from the interface.

These and other objects will become apparent from a consideration of the following detailed description.

DETAILED DESCRIPTION

Interfacial polymerization of organosilicon reactants gives rise to new structures and combinations of structures which cannot be obtained by other routes, such as well-defined structures of dimethyl/diphenyl copolymers and $(A_1 B_n)_x$ type block copolymers.

Block copolymers contain linear sequences of comonomer A joined to linear sequences of comonomer B. By block copolymer we mean a sequence distribution in copolymers of the type $(A_1 B_n)_x$ or -BBBABBBABBBBBABBBBA-, where A is a diphenyl unit and B is a dimethyl block. By diphenyl unit and dimethyl block, we mean siloxane units of the following types:

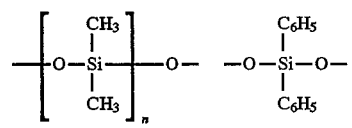

One representative example of an $(A_1 B_n)_x$ block copolymer is:

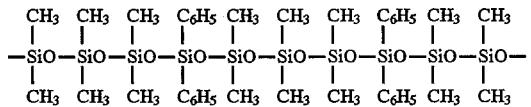

However, a major difference exists between interfacial polymerization reactions of organosilicon monomers according to our invention compared to prior methods, and the difference resides in the use of water as one of the solvents. Although water has been used in many organic systems, no water is used in polymerization reactions in our method. This is because the presence of water in polycondensation of organosilicon monomers could be detrimental, and can lead to low molecular weights and complete loss of control over polymer structure. This is due to rearrangement and re-equilibration of the poller in the presence of any residual soluble acid or base. Therefore, water is detrimental if an acid or base are formed, which can lead to rearrangement and equilibrium polymerization, i.e., formation of cyclic siloxane species.

Another difference between our method and prior methods is that if water is present, the organosilicon monomers react with themselves, whereas in the prior methods, water soluble organic reactants are stable in solution and react only across the interface.

But similar to the prior methods of preparing organic polymers by interfacial polymerization reactions, the overall rate of conversion to the polymer is higher than bulk polymerization, provided the polymer is continuously removed from the interface to sustain a constant rate. Removal of the polymer formed at the interface is relatively simple if the polymer has sufficient mechanical strength. In that case, it can be pulled out from the interface as in the prior methods of preparing polyamides and polyesters. It is, however, more difficult if the polymer is mechanically weak.

As we noted above, we react an organodihalosilane or an organodiacyloxysilane in mutually immiscible solvents with a silanolate or an organosilanolate. These silanolates are alkali-metal salts and metal derivatives of organosilanols having the formulas $R''_xSi(OM)_{4-x}$ or $MO(R''_2SiO)_nM$. In these formulas, R" is an alkyl radical of 1–6 carbon atoms, an aryl radical, an alkenyl radical, an alkylamino radical, or an epoxy radical; x is 0–2; and n is at least one.

Suitable alkyl and aryl R" radicals are methyl, ethyl, and phenyl. Suitable alkenyl R" radicals are vinyl, allyl, butenyl, and hexenyl. Suitable aminoalkyl R" radicals are aminopropyl and ethylene diaminopropyl. Suitable epoxy R" radicals are 3-glycidoxypropyl and 2-(3,4-epoxycyclohexyl)-ethyl. M is an alkali metal such as lithium, sodium, potassium, rubidium, and cesium. Sodium and potassium are the preferred alkali metals. For our invention, the value of x is preferably 2; and the value of n is preferably 1 to about 20, most preferably 3–20.

Examples of some suitable silanolate compounds are disodium diphenylsilanolate $(C_6H_5)_2Si(ONa)_2$, disodium dimethylsilanolate $(CH_3)_2Si(ONa)_2$, disodium methylaminopropylsilanolate $(CH_3)$ $[H_2NCH_2CH_2CH_2]Si(ONa)_2$, potassium equivalents thereof, and potassium dimethylsilanolate $KO[(CH_3)_2SiO]_nK$ where n is 15.

Silanolates can be obtained by reacting diorgano alkoxysilanes with alkali-metal hydroxides, or by reacting diorgano silanols with alkali metals or alkali-metal hydroxides. Such methods and details of the methods can be found in British Patent 631,506 (Nov. 3, 1949), and U.S. Pat. No. 3,641,090 (Feb. 8, 1972), incorporated herein by reference.

Representative of some suitable organodihalosilanes that can be used are organodichlorosilanes such as 2-acetoxyethylmethyldichlorosilane, 3-acetoxypropylmethyldichlorosilane, allylmethyldichlorosilane, amyldichlorosilane, amylmethyldichlorosilane, 5-(bicycloheptenyl) methyldichlorosilane, 2-(bicycloheptyl) methyldichlorosilane, bis-(3-chloropropyl)dichlorosilane, bis(3-cyanopropyl)dichlorosilane, 4-butenyldichloromethylsilane, 2-(carbomethoxy) ethylmethyldichlorosilane, 2-chloroethylmethyldichlorosilane, chloromethylmethyldichlorosilane, chlorophenylmethyldichlorosilane, 3-chloropropyldichlorosilane, 3-chloropropylhexyldichlorosilane, 3-chloropropylmethyldichlorosilane, 2-cyanoethylmethyldichlorosilane, 3-cyanopropylmethyldichlorosilane, [2-(3-cyclohexenyl) ethyl]methyldichlorosilane, cyclohexyldichlorosilane, cyclopentamethylenedichlorosilane, cyclopentyldichlorosilane, cyclotetramethylenedichlorosilane, cyclotrimethylenedichlorosilane, n-decylmethyldichlorosilane, diamyldichlorosilane, di-n-butyldichlorosilane, di-t-butyldichlorosilane, (dichloromethyl)methyldichlorosilane, dichlorosilane, dicyclohexyldichlorosilane, diethyldichlorosilane, di-n-hexyldichlorosilane, dimesityldichlorosilane, dimethyldichlorosilane, dioctyldichlorosilane, diphenyldichlorosilane, di-n-propyldichlorosilane, n-docosylmethyldichlorosilane, ethyldichlorosilane, ethylmethyldichlorosilane, n-heptylmethyldichlorosilane, hexadecyldichlorosilane, hexyldichlorosilane, n-hexylmethyldichlorosilane, isobutyldichlorosilane, 3-methacryloxypropylmethyldichlorosilane, 3-(4-methoxyphenyl)propylmethyldichlorosilane, methylcyclohexyldichlorosilane, methyldichlorosilane, methyldodecyldichlorosilane, methylisopropyldichlorosilane, methyl-n-octadecyldichlorosilane, methyl-n-octyldichlorosilane, (p-methylphenethyl)methyldichlorosilane, methyl(2-phenethyl)dichlorosilane, methylphenyldichlorosilane, methyl-n-propyldichlorosilane, phenylallyldichlorosilane, phenyl(3-chloropropyl)dichlorosilane, phenyldichlorosilane, phenylethyldichlorosilane, phenylvinyldichlorosilane, 1-propyl(3-chloropropyl) dichlorosilane, n-propyldichlorosilane, p-tolylmethyldichlorosilane, (3,3,3-trifluoropropyl) methyldichlorosilane, vinylethyldichlorosilane, and vinylmethyldichlorosilane.

Representative of some suitable organoacyloxysilanes that can be used are organodiacetoxysilanes such as diethyldiacetoxysilane, dimethyldiacetoxysilane, diphenyldiacetoxysilane, di-t-butoxydiacetoxysilane, methyldiacetoxysilane, and methylphenyldiacetoxysilane.

There are certain conditions necessary for establishing the suitability of any solvent for use in our invention. First, solvent I and solvent II are not miscible. Second, solvent I and solvent II are nonaqueous. Third, solvent I is a good solvent for monomer I but not a good solvent for monomer II. Fourth, solvent II is a good solvent for monomer II but not a good solvent for monomer I. Fifth, the resulting products must be insoluble in at least one of the phases. Generally, a polar solvent in combination with a non-polar solvent will satisfy these conditions.

Given these conditions, we have found that solvents for the organodichlorosilane phase and the organodiacetoxysilane phase are diphenyl ether $(C_6H_5)_2O$, mineral oil, hexane, and acetonitrile $CH_3CN$. Representative solvents for the silanolate phase are cyclohexane $C_6H_{12}$, polyethylene glycol 400 i.e., $H(OCH_2CH_2)_nOH$ where n is about 400, and dimethylformamide $HCON(CH_3)_2$.

Generally, reactions of organohalosilanes with metal silanolates proceed according to the scheme

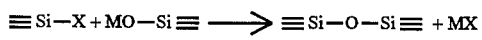

where M is Na or K. When M is Na and X is Cl the scheme is

Reactions of organoacyloxysilanes (i.e., organoacetoxysilanes) with silanolates proceed according to the scheme

where Ac is acetate $CH_3COO-$.

Such reactions when carried out by our method can be conducted without stirring, and at temperatures generally in the range of about 10°–95° C. The following examples set forth and illustrate our invention in more detail

EXAMPLE I

Diphenyldichlorosilane (4.0 g, $1.58 \times 10^{-2}$ moles) was dissolved in 10 g of diphenyl ether in a 50 ml beaker. In another beaker, 4.7 g of potassium polydimethylsilanolate $KO[(CH_3)_2SiO]_{15}K$ having a neutral equivalent of 1,145 g silanolate per mole potassium containing $0.41 \times 10^{-2}$ moles K, was dissolved in 10 g of cyclohexane. Half of the diphenyldichlorosilane and diphenyl ether solution was poured into a 1.5 ounce vial. Half of the cyclohexane and potassium dimethylsilanolate solution was carefully introduced into the vial to form a distinct two phase system. The vial containing the two phases was sealed and allowed to sit on a bench top at ambient temperature (21° C.) for approximately 90 minutes, at which time a distinct haze was observed at the interface. The remainder of the two solutions was mixed in the same manner, placed in a sealed vial, and placed in an 80° C. oven for 16 hours. A white solid was observed at the interface. This solid was dissolved in tetrahydrofuran (THF) and its molecular weight was determined by Gel Permeation Chromatography (GPC). The data indicated that a high molecular weight polymer was obtained with a peak molecular weight of 52,000; a number average molecular weight (Mn) of 26,500; and a weight average molecular weight (Mw) of 41,000.

EXAMPLE II

Example I was repeated and a second solvent system was evaluated by adding 4.58 g ($22.3 \times 10^{-3}$ mole) of diphenyldichlorosilane to 12.8 g of light mineral oil. This solution was gently placed over 3.7 g of potassium dimethylsilanolate $KO[(CH_3)_2SiO]_{15}K$ containing $3.2 \times 10^{-3}$ moles K in 13.4 g of polyethylene glycol 400. The two phases were placed in a 50° C. oven for 16 hours. The product was viscous. When the sample was prepared in THF and analyzed against polystyrene standards using differential refractometry, Gel Permeation Chromatography data indicated that a high molecular weight polymer was obtained. The polymer had a peak molecular weight of 22,000; a number average molecular weight (Mn) of 13,590; and a weight average molecular weight (Mw) of 29,260. This material was examined by $^{29}Si$ Nuclear Magnetic Resonance (NMR) to determine whether diphenyl units and dimethyl units had each been incorporated into the structure. The results of $^{29}Si$ NMR indicated that more than 95% of the diphenyl silane had been incorporated into the siloxane polymer. Further, the average number of dimethyl siloxane units around a diphenyl unit was 14.5, which is about the same as the initial chain length of the dimethyl silanolate, i.e., degree of polymerization of 15.

EXAMPLE III

Example I was repeated at ambient temperature and a second silicon containing monomer was evaluated by adding 1.5 g of diphenyldiacetoxysilane (0.01M acetoxy units) to 20.0 g of acetonitrile. This solution was gently placed over 11.5 g of potassium dimethylsilanolate $KO[(CH_3)_2SiO]_{15}K$ containing 0.01M $K^+$ in 20 g cyclohexane. After two hours, a gel-like polymer was formed at the interface. The polymer had sufficient mechanical strength that it could be pulled out from the interface. When a sample was prepared in THF and analyzed against polystyrene standards using differential refractometry, Gel Permeation Chromatography data indicated that a high molecular weight polymer was obtained. The polymer had a number average molecular weight (Mn) of 40,820; and a weight average molecular weight (Mw) of 112,000.

Other variations in compounds, compositions, and methods described may be made without departing from the essentials of our invention. The forms of our invention are exemplary and not limitations on its scope as defined in the claims.

We claim:

1. A method of making a copolymer comprising (A) reacting (i) a nonaqueous, organic solvent solution of a dihalo organosilicon compound or a diacyloxy organosilicon compound at or near an interface formed by the nonaqueous organic solvent solution and (ii) an immiscible nonaqueous organic solvent solution of a silanolate or organosilanolate of formula $R''_xSi(OM)_{4-x}$ or $MO(R''_2SiO)_nM$ where R'' is an alkyl radical of 1–6 carbon atoms, an aryl radical, an alkenyl radical, an alkylamino radical, or an epoxy radical; x is 0–2; n is at least one; and M is an alkali metal; and (B) recovering the copolymer at or near the interface of the solvent solutions.

2. A method according to claim 1 in which the organic solvent for the dihalo or diacyloxy organosilicon compound is selected from the group consisting of diphenyl ether, mineral oil, hexane, and acetonitrile; and the organic solvent for the silanolate or organosilanolate is selected from the group consisting of cyclohexane, a polyethylene glycol [400] of the formula $H(OCH_2CH_2)_nOH$ where n is about 400, and dimethylformamide.

3. A method according to claim 1 in which the silanolate or organosilanolate has the formula $MO(R''_2SiO)_nM$ where R'' is an alkyl radical of 1–6 carbon atoms, an aryl radical, an alkenyl radical, an alkylamino radical, or an epoxy radical; n is 1–20; and M is an alkali metal.

4. A method according to claim 3 in which the silanolate or organosilanolate is potassium polydimethylsilanolate $KO[(CH_3)_2SiO]_nK$ where n is 3–20.

5. A method according to claim 1 in which the dihalo organosilicon compound is an organodichlorosilane selected from the group consisting of 2-acetoxyethylmethyldichlorosilane, 3-acetoxypropylmethyldichlorosilane, allylmethyldichlorosilane, amyldichlorosilane, amylmethyldichlorosilane, 5-(bicycloheptenyl) methyldichlorosilane, 2-(bicycloheptyl) methyldichlorosilane, bis-(3-chloropropyl)dichlorosilane, bis(3-cyanopropyl)dichlorosilane, 4-butenyldichloromethylsilane, 2-(carbomethoxy) ethylmethyldichlorosilane, 2-chloroethylmethyldichlorosilane, chloromethylmethyldichlorosilane, chlorophenylmethyldichlorosilane, 3-chloropropyldichlorosilane, 3-chloropropylhexyldichlorosilane, 3-chloropropylmethyldichlorosilane, 2-cyanoethylmethyldichlorosilane, 3-cyanopropylmethyldichlorosilane, [2-(3-cyclohexenyl) ethyl]methyldichlorosilane, cyclohexyldichlorosilane, cyclopentamethylenedichlorosilane, cyclopentyldichlorosilane, cyclotetramethylenedichlorosilane, cyclotrimethylenedichlorosilane, n-decylmethyldichlorosilane, diamyldichlorosilane, di-n-butyldichlorosilane, di-t-butyldichlorosilane, (dichloromethyl)methyldichlorosilane, dichlorosilane, dicyclohexyldichlorosilane, diethyldichlorosilane, di-n-hexyldichlorosilane, dimesityldichlorosilane, dimethyldichlorosilane, dioctyldichlorosilane, diphenyldichlorosilane, di-n-propyldichlorosilane, n-docosylmethyldichlorosilane, ethyldichlorosilane, ethylmethyldichlorosilane, n-heptylmethytdichlorosilane, hexadecyldichlorosilane, hexyldichlorosilane, n-hexylmethyldichlorosilane, isobutyldichlorosilane, 3-methacryloxypropylmethyldichlorosilane, 3-(4-methoxyphenyl)propylmethyldichlorosilane, methylcyclohexyldichlorosilane, methyldichlorosilane, methyldodecyldichlorosilane, methylisopropyldichlorosilane, methyl-n-octadecyldichlorosilane, methyl-n-octyldichlorosilane, (p-methylphenethyl)methyldichlorosilane, methyl(2-phenethyl)dichlorosilane, methylphenyldichlorosilane, methyl-n-propyldichlorosilane, phenylallyldichlorosilane, phenyl(3-chloropropyl)dichlorosilane, phenyldichlorosilane, phenylethyldichlorosilane, phenylvinyldichlorosilane, 1-propyl(3-chloropropyl) dichlorosilane, n-propyldichlorosilane, p-tolylmethyldichlorosilane, (3,3,3-trifluoropropyl) methyldichlorosilane, vinylethyldichlorosilane, and vinylmethyldichlorosilane.

6. A method according to claim 1 in which the diacyloxy organosilicon compound is an organodiacetoxysilane selected from the group consisting of diethyldiacetoxysilane, dimethyldiacetoxysilane, diphenyldiacetoxysilane, di-t-butoxydiacetoxysilane, methyldiacetoxysilane, and methylphenyldiacetoxysilane.

7. A method according to claim 5 in which the dihalo organosilicon compound is diphenyldichlorosilane.

* * * * *